(12) United States Patent
Yasuda

(10) Patent No.: US 10,814,398 B2
(45) Date of Patent: Oct. 27, 2020

(54) CONTROLLER FOR CHIP CUTTING WHEN PROCESSING A ROTATING WORKPIECE

(71) Applicant: Fanuc Corporation, Minamitsuru-gun, Yamanashi (JP)

(72) Inventor: Masashi Yasuda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/281,595

(22) Filed: Feb. 21, 2019

(65) Prior Publication Data

US 2019/0265677 A1  Aug. 29, 2019

(30) Foreign Application Priority Data

Feb. 27, 2018  (JP) .................................. 2018-033840

(51) Int. Cl.
*B23B 25/02* (2006.01)
*G05B 19/4093* (2006.01)
(Continued)

(52) U.S. Cl.
CPC .............. *B23B 25/02* (2013.01); *B23B 27/22* (2013.01); *B23G 1/04* (2013.01); *B23G 1/44* (2013.01);
(Continued)

(58) Field of Classification Search
CPC ..... B23B 25/02; B23B 27/22; G05B 19/4093; G05B 2219/36204; G05B 2219/36198;
(Continued)

(56) References Cited

U.S. PATENT DOCUMENTS 3,909,896 A * 10/1975 Krozal .................... B23B 27/08
407/116
4,613,260 A *  9/1986 Hayes ....................... B23G 1/22
408/74
(Continued)

FOREIGN PATENT DOCUMENTS

EP         3241637 A1    11/2017
JP    2015-225518 A     12/2015
(Continued)

OTHER PUBLICATIONS

P.A.S. Ralston, K.E. Stoll, T.L. Ward, "Fuzzy logic control of chip form during turning", Computers & Industrial Engineering, vol. 22, Issue 3, 1992, pp. 223-230. (Year: 1992).*
(Continued)

*Primary Examiner* — Michael D Masinick
(74) *Attorney, Agent, or Firm* — RatnerPrestia

(57) ABSTRACT

A controller controls a machine tool, which performs thread cutting for a workpiece, according to a machining program. The controller analyzes operating conditions of a cutting-up/cutting-in motion commanded in the machining program and inserts a cutting-up/cutting-in motion created based on the analyzed operating conditions into the thread cutting. In the insertion of the cutting-up/cutting-in motion into the thread cutting, a cycle including a cutting-in operation, a cutting-up operation for separating chips by raising the cutting tool for cutting in the radial direction of the workpiece, and an operation to cause the cutting tool to approach a start position of an immediately preceding cutting-up operation so as not to interfere with the workpiece is repeatedly performed.

4 Claims, 10 Drawing Sheets

(51) Int. Cl.
  *B23G 1/04* (2006.01)
  *B23B 27/22* (2006.01)
  *B23G 1/44* (2006.01)
(52) U.S. Cl.
  CPC .............. *G05B 19/4093* (2013.01); *G05B 2219/36198* (2013.01); *G05B 2219/36204* (2013.01); *G05B 2219/49047* (2013.01)
(58) Field of Classification Search
  CPC .......... G05B 2219/49047; G05B 2219/35349; G05B 19/19; B23G 1/04; B23G 1/44
  See application file for complete search history.

(56) References Cited

U.S. PATENT DOCUMENTS

| | | | | |
|---|---|---|---|---|
| 4,621,547 | A | * | 11/1986 | Yankoff ............. B23Q 11/1038 82/1.11 |
| 4,752,159 | A | * | 6/1988 | Howlett ................... B23G 1/06 408/107 |
| 2011/0254495 | A1 | * | 10/2011 | Barkman ............. G05B 19/401 318/561 |
| 2011/0254496 | A1 | * | 10/2011 | Barkman ............. G05B 19/182 318/561 |
| 2012/0039679 | A1 | * | 2/2012 | Kundracik ............... B23G 1/24 408/1 R |
| 2015/0346707 | A1 | | 12/2015 | Haga et al. |
| 2016/0082522 | A1 | * | 3/2016 | Ostertag ................. B23B 31/11 29/888.06 |
| 2017/0304920 | A1 | | 10/2017 | Sannomiya et al. |
| 2018/0369920 | A1 | * | 12/2018 | Takahashi ................ B23B 1/00 |

FOREIGN PATENT DOCUMENTS

| | | |
|---|---|---|
| WO | 2016/056526 A1 | 4/2016 |
| WO | 2016067371 A1 | 5/2016 |
| WO | 2019012937 A1 | 1/2019 |

OTHER PUBLICATIONS

Notice of Reasons for Refusal for Japanese Application No. 2018-033840, dated Feb. 18, 2020, with translation, 8 pages.

* cited by examiner

CONTROLLER FOR CHIP CUTTING WHEN PROCESSING A ROTATING WORKPIECE

RELATED APPLICATIONS

The present application claims priority to Japanese Patent Application Number 2018-033840 filed Feb. 27, 2018, the disclosure of which is hereby incorporated by reference herein in its entirety.

BACKGROUND OF THE INVENTION

Field of the Invention

The present invention relates to a controller, and more particularly, to a controller having a function of performing thread cutting while cutting chips into pieces.

Description of the Related Art

In conventional thread cutting, a tool continues cutting a workpiece in one direction, so that chips produced during machining are continuously produced without being separated as the tool moves. Thus, there is a problem that the chips may be caught by the tool or contact the workpiece, thereby damaging it, if the machining is continued without removing them.

Moreover, the tool and the workpiece are always in contact with each other during the machining, so that a coolant cannot efficiently circulate between them. Therefore, the tool life may be reduced by friction or the machining accuracy may be reduced by deformation of the cutting edge of the tool due to heat generation, thus resulting in a problem.

Various methods are proposed to solve these well-known problems. For example, a technique for implementing thread cutting while shredding chips is disclosed in International Publication No. 2016/056526. In a first attempt of cutting-in machining, as shown in FIGS. 1 and 2, a reciprocating motion is performed such that the cutting-in machining is started from the start of its return stroke and that the distal end of a cutting tool is caused to reach the outer peripheral surface of a workpiece during the return stroke of the reciprocating motion of the cutting tool. In this way, the chips are cut into pieces at a portion where the distal end of the cutting tool reaches the outer peripheral surface of the workpiece. In a second attempt of the cutting-in machining, the phase at the time of the second cutting-in machining is changed relative to the phase at the time of the first cutting-in machining, and the trajectory of the cutting tool during the return stroke of the second cutting-in machining is controlled so as to reach the position of the trajectory of the cutting tool in the first cutting-in machining.

The thread cutting method described in International Publication No. 2016/056526 has the following problems.

Since there are spots where the tool is depressed for cutting in the depth direction of the workpiece diameter, as shown in FIG. 3, the chips are adversely affected. Since the tool is caused to vibrate in order to separate the chips, a drive mechanism may possibly be mechanically damaged as a central structure and the vibration of the entire machine may produce noise and deteriorate the machining accuracy. Moreover, since the tool is caused to vibrate in the radial direction of the workpiece, the cutting load continually changes, thus resulting in degradation of the finished shape and a bad influence on the chips. Furthermore, due to a tracking error and backlash during cutting work, the tool cannot be caused to vibrate as commanded and the chips cannot be separated, in some cases. For overcoming this problem, setting of a large vibration amplitude that definitely ensures chip separation is required, but such setting will be made complicated.

If a large vibration amplitude that definitely ensures chip separation is set in order to overcome this problem, the other problems described above are liable to occur.

Japanese Patent Application Laid-Open No. 2015-225518 describes a method capable of solving these problems, in which machining is performed while cutting chips into pieces by a cutting-up/cutting-in motion. However, this patent document does not refer to how to optimize the afore-mentioned method in thread cutting.

SUMMARY OF THE INVENTION

The present invention has been made to solve the above problems and has an object to provide a controller having a function of performing thread cutting while cutting chips into pieces.

In order to achieve the above object, a controller of the present invention controls a machine tool which performs thread cutting for a rotating workpiece by moving a cutting tool pressed against the workpiece, according to a machining program, and comprises a cutting-up/cutting-in motion operating condition analysis unit configured to analyze operating conditions of a cutting-up/cutting-in motion commanded in the machining program and a cutting-up/cutting-in motion insertion unit configured to insert a cutting-up/cutting-in motion created based on the operating conditions analyzed by the cutting-up/cutting-in motion operating condition analysis unit into the thread cutting. The cutting-up/cutting-in motion insertion unit is configured to repeatedly perform, along a thread groove cutting direction, a cycle including mainly a cutting-in operation, a cutting-up operation which cuts chips into pieces by raising the cutting tool for cutting in the radial direction of the workpiece, and an operation to cause the cutting tool to approach a start position of an immediately preceding cutting-up operation so as not to interfere with the workpiece.

The cutting-up/cutting-in motion insertion unit may be configured to perform the cutting-up operation in a path which makes a cutting amount to be obtained starting from the start position of a cutting-up operation until an axial coordinate value of a position in which the cutting tool in the directly preceding cutting-up operation and the workpiece are separated from each other is reached is constant.

The cutting-up/cutting-in motion insertion unit may be configured to perform the cutting-in operation and the cutting-up operation in a path in which a path length from a start position of the cutting-in operation to an end position of the cutting-up operation does not exceed a predetermined allowable length.

The cutting-up/cutting-in motion insertion unit may be configured to change a path for the cutting-in operation, a path for the cutting-up operation, or a path for the operation for the approach, interrupt the cutting-in operation, the cutting-up operation, or the operation for the approach, or change an insertion position for the cycle if a predetermined non-interference area in the workpiece interferes with the path for the cutting-in operation, the path for the cutting-up operation, or the path for the operation for the approach.

According to the present invention, there can be provided a controller having a function of performing thread cutting while cutting chips into pieces.

DETAILED DESCRIPTION OF THE PREFERRED EMBODIMENTS

A configuration of a controller 10 according to one embodiment of the present invention will be described with reference to FIG. 4.

Figure 1:
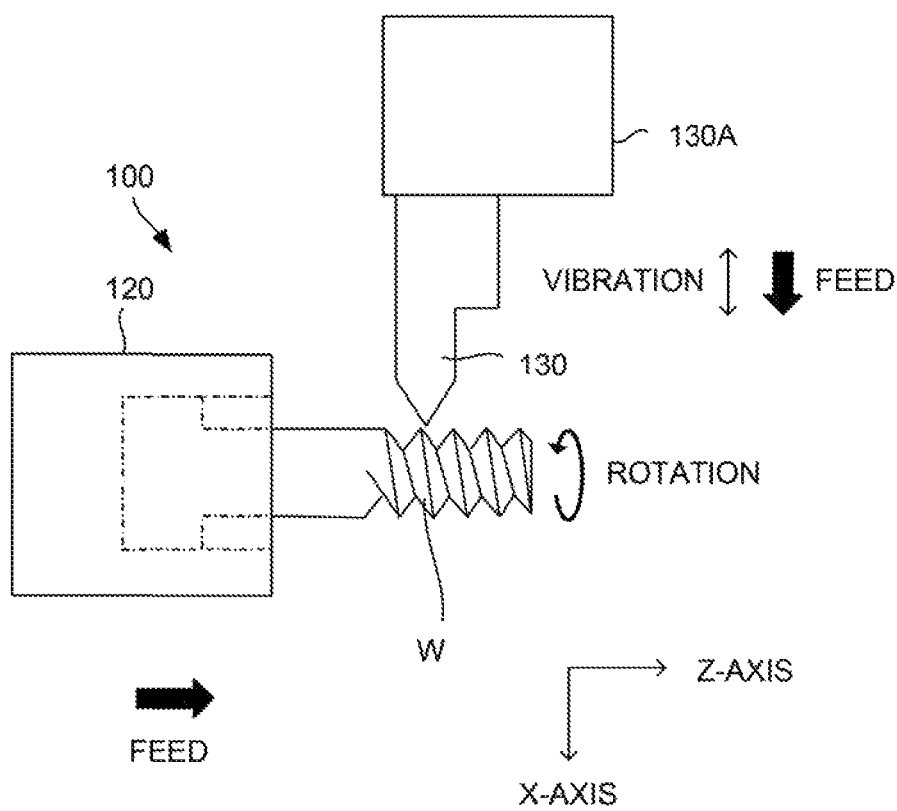
FIG. 1 is a diagram showing a prior art technique for performing thread cutting while shredding chips.
Figure 2:
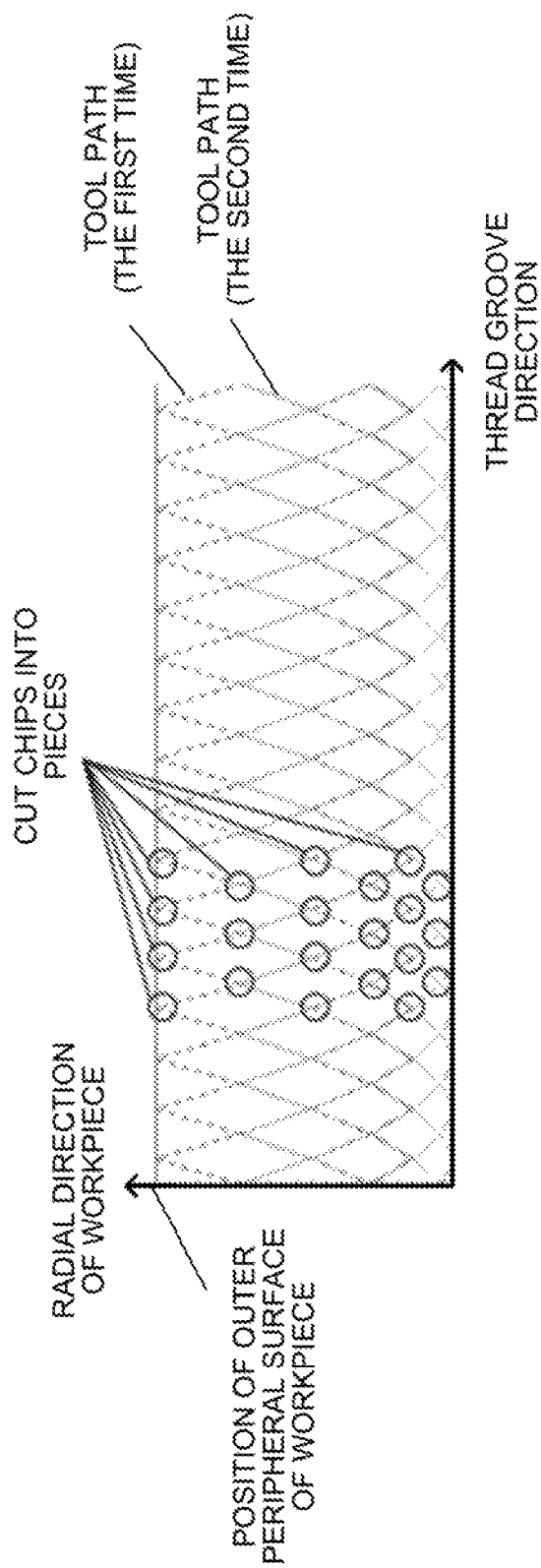
FIG. 2 is a diagram showing a prior art technique for performing thread cutting while shredding chips.
Figure 3:
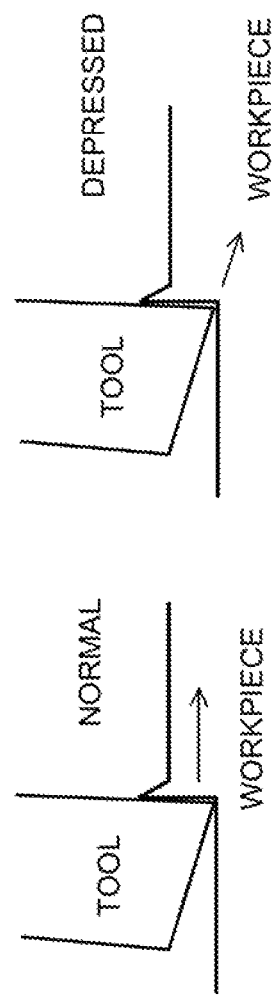
FIG. 3 is a diagram showing a problem of the prior art techniques.
Figure 4:
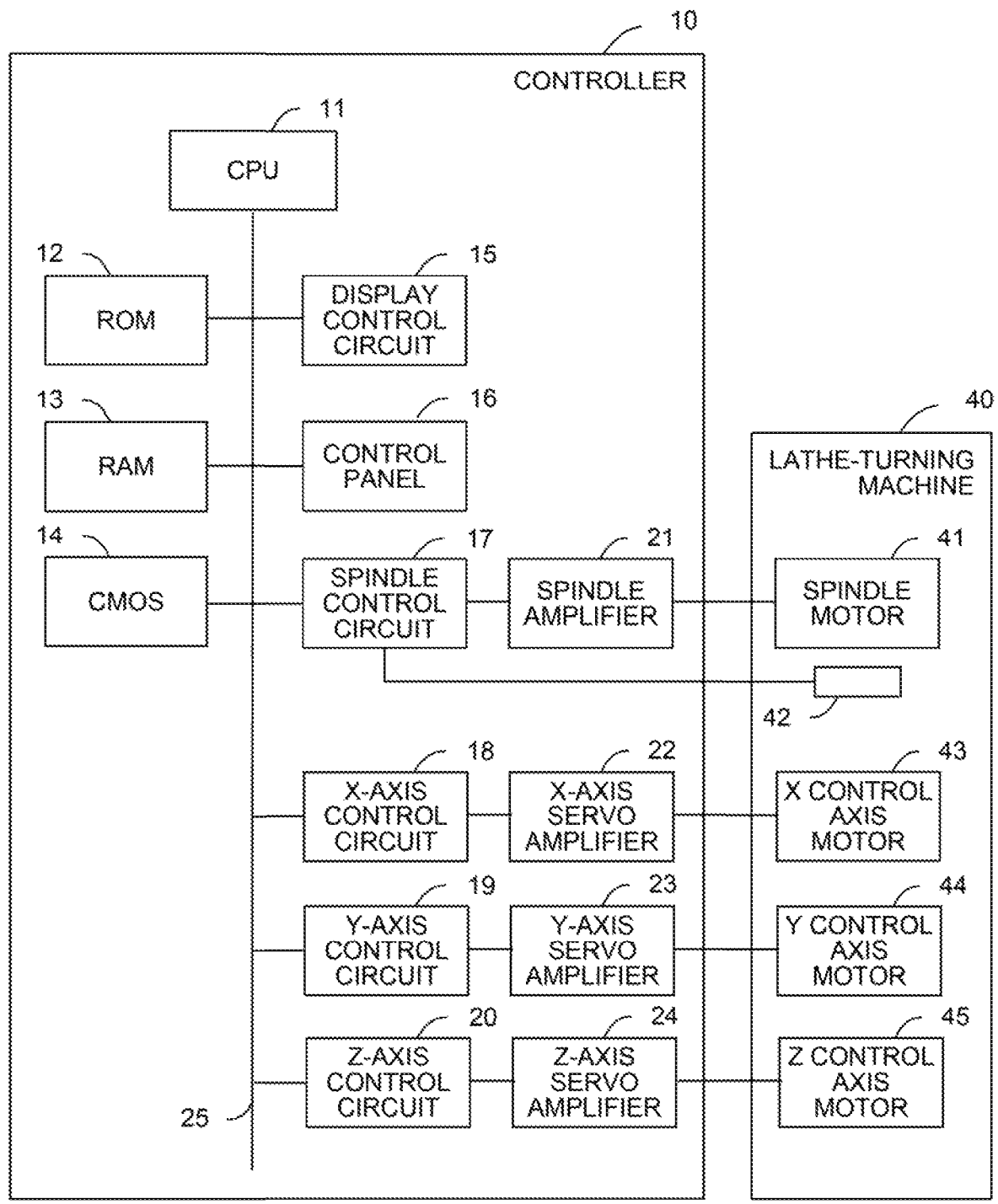
FIG. 4 is a block diagram showing a hardware configuration of a controller according to one embodiment of the present invention.

FIG. 4 is a schematic block diagram of the controller 10. The controller 10 comprises a processor (CPU) 11, ROM 12, RAM 13, CMOS memory 14, display control circuit 15, control panel 16, spindle control circuit 17, axis control circuits 18 to 20, spindle amplifier 21, axis servo amplifiers 22 to 24, and bus 25. The CPU 11 reads out system programs stored in the ROM 12 through the bus 25 and controls the entire controller 10 according to the system programs. The RAM 13 is temporarily loaded with temporary calculation data and display data and various data input through an input means (not shown). Moreover, the ROM 12 is previously loaded with an editing function and various system programs required for the creation and editing of a machining program. The CMOS memory 14 is constructed as a non-volatile memory that is backed up by a battery (not shown) so that its storage state can be maintained even when the controller 10 is powered off. The machining program and the like are stored in the CMOS memory 14.

The spindle control circuit 17 receives a spindle rotation command and outputs a spindle speed signal to the spindle amplifier 21. On receiving the spindle speed signal, the spindle amplifier 21 rotates a spindle motor 41 at a commanded rotational speed. A position coder 42 feeds back a feedback signal in synchronism with the rotation of the spindle motor 41 so that speed control is performed.

The axis control circuits 18 to 20 receive movement commands for axes for a cutting operation and outputs them to the axis servo amplifiers 22 to 24. On receiving these commands, the axis servo amplifiers 22 to 24 drive control axis motors 43 to 45, respectively, of a lathe-turning machine 40. The control axis motors 43 to 45, which have position/speed detectors (not shown) built-in, feed back position/speed feedback signals from the position/speed detectors to the axis control circuits 18 to 20, thereby performing position/speed feedback control. A description of this position/speed feedback control is omitted herein.

Figure 5A:
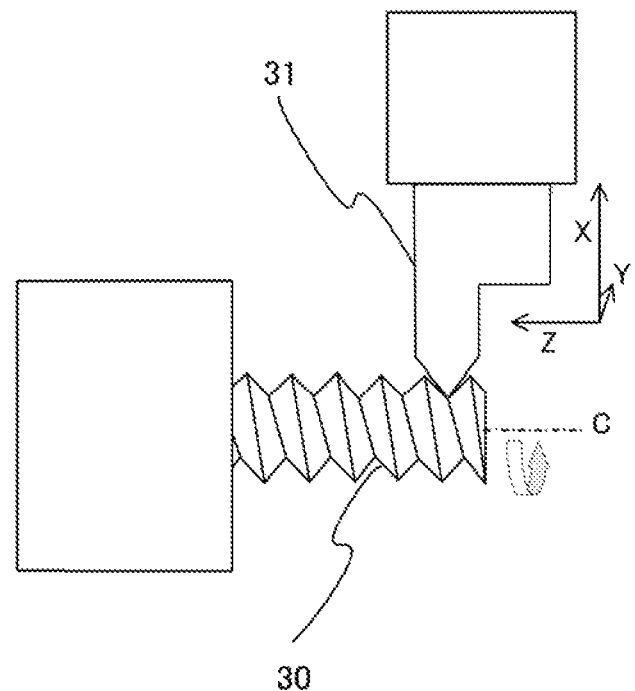
FIGS. 5A and 5B are diagrams illustrating a cutting-up/cutting-in motion performed by the controller of FIG. 4.
Figure 5B:
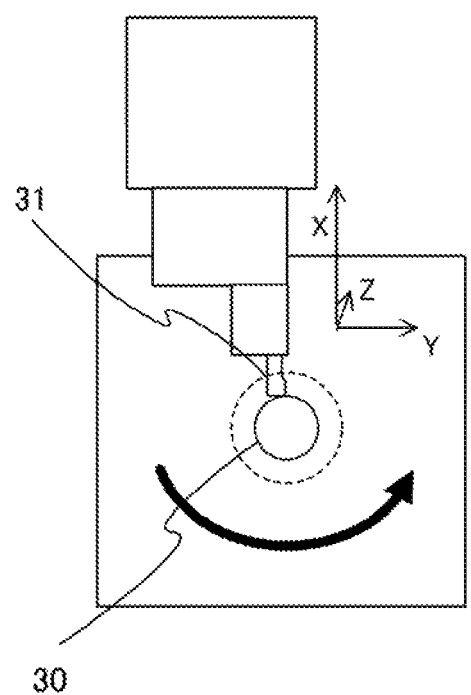

FIGS. 5A and 5B are diagrams illustrating a cutting-up/cutting-in motion according to the present embodiment.

When thread turning is performed by bringing a tool 31 moving in a Z-direction into contact with a workpiece 30 rotating about a rotation axis C, the workpiece 30 is scraped and produces chips. By inserting the cutting-up/cutting-in motion of the tool in a plane in an X-thread groove cutting direction during a machining operation for such cutting work, the chips are cut into pieces and a coolant is circulated between the tool 31 and the workpiece 30.

Figure 6:
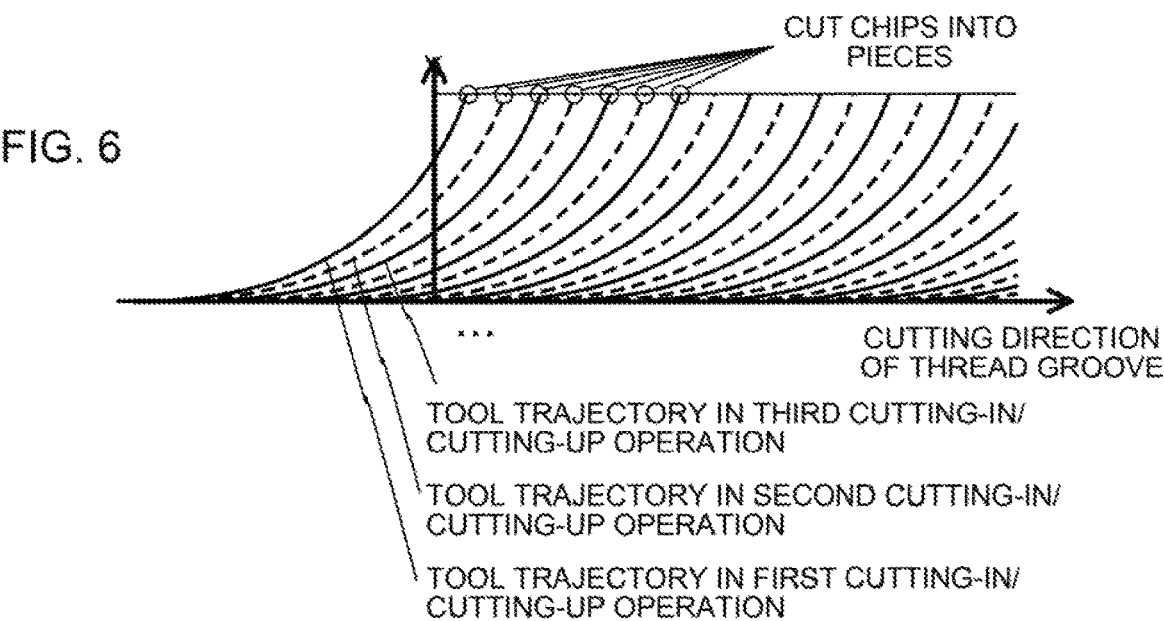
FIG. 6 is a diagram illustrating the cutting-up/cutting-in motion performed by the controller of FIG. 4.

FIG. 6 is an enlarged diagram showing the cutting-up/cutting-in motion in the plane in the X-thread groove cutting direction.

Typically, the cutting-up/cutting-in motion is a circular motion. This circular motion is a movement represented by a circle for the trajectory of the tool and is defined by arbitrarily setting its radius. A thread groove is cut by repeatedly performing such a cutting-up/cutting-in motion while gradually shifting a cutting start point in a thread groove cutting direction.

FIGS. 7A to 7E are diagrams showing, on a time-series basis, the progress of the cutting-up/cutting-in motion in the plane in the X-thread groove cutting direction.

Figure 7A:
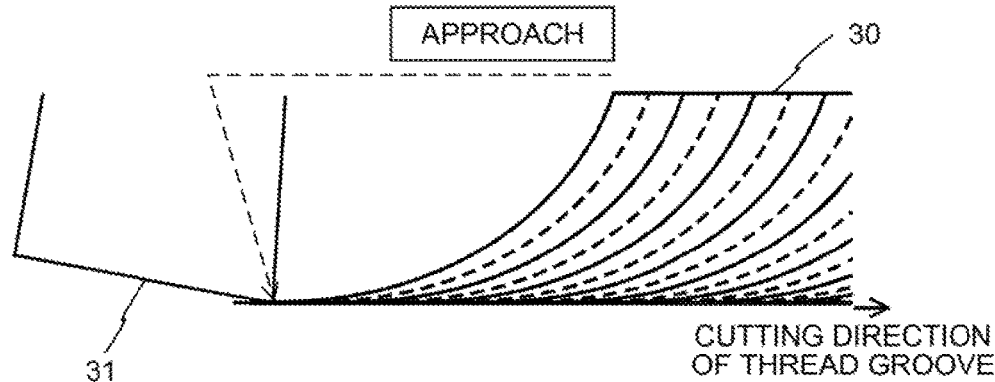
FIG. 7A is a diagram illustrating the cutting-up/cutting-in motion performed by the controller of FIG. 4.
Figure 7B:
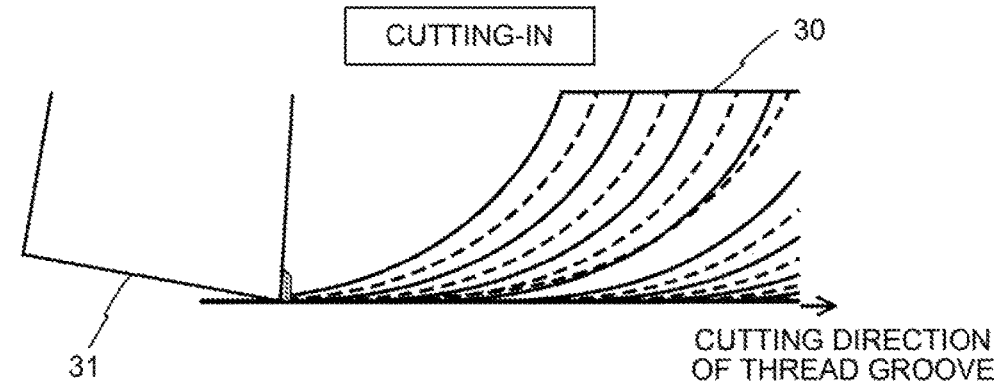
FIG. 7B is a diagram illustrating the cutting-up/cutting-in motion performed by the controller of FIG. 4.
Figure 7C:
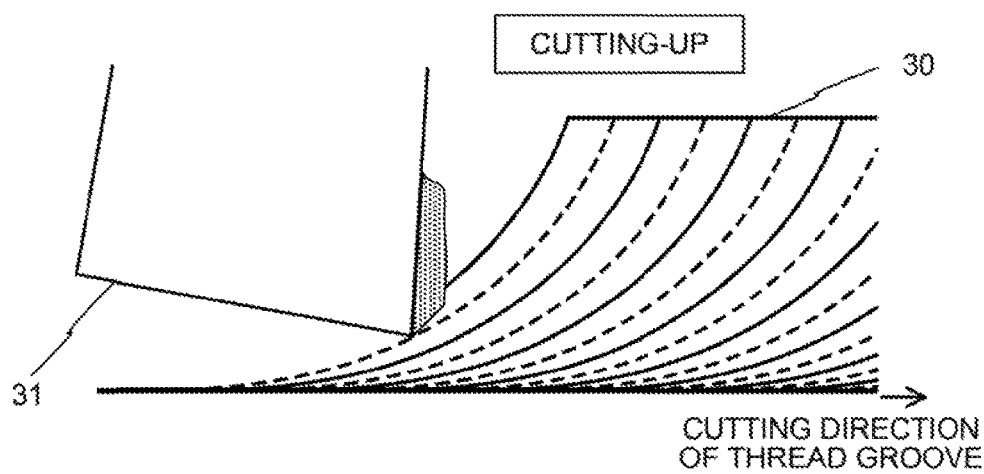
FIG. 7C is a diagram illustrating the cutting-up/cutting-in motion performed by the controller of FIG. 4.
Figure 7D:
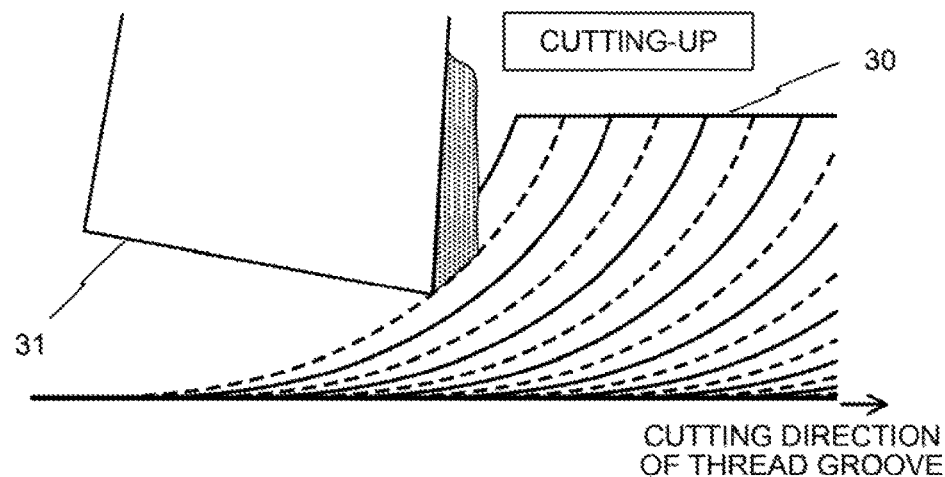
FIG. 7D is a diagram illustrating the cutting-up/cutting-in motion performed by the controller of FIG. 4.
Figure 7E:
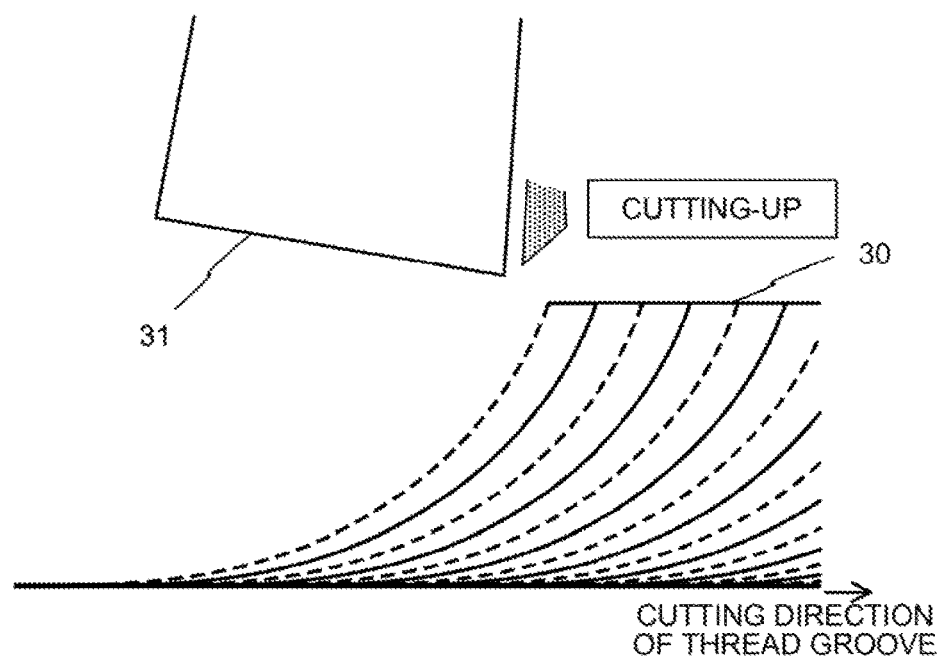
FIG. 7E is a diagram illustrating the cutting-up/cutting-in motion performed by the controller of FIG. 4.
Figure 10:
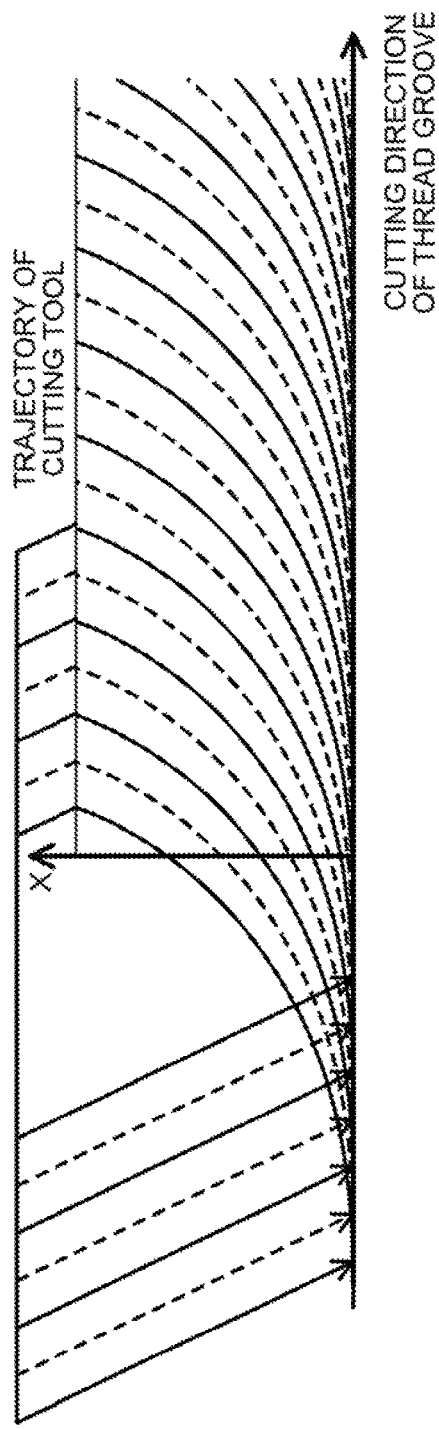
FIG. 10 is a diagram illustrating an approach operation performed by the controller of FIG. 4.

First, as shown in FIG. 7A, the tool 31 approaches a cutting-in start position. Then, as shown in FIG. 7B, the tool 31 starts to cut in the workpiece 30. When cutting to a predetermined depth is made by the cutting-in operation, a cutting-up operation such as that shown in FIG. 7C is started. The chips are cut into pieces by performing the cutting-up operation up to an end surface of the workpiece, as shown in FIGS. 7D and 7E. In machining an external thread, the cutting-up operation is an operation for allowing the tool to escape to the outside of the outer diameter of the workpiece, whereas in machining an internal thread, the cutting-up operation is an operation for allowing the tool to escape into the inside of the inner diameter of the workpiece. When the cutting-up operation is ended, the workpiece 30 and the tool 31 approach the start position for the next cutting-in operation so as not to interfere with each other, as shown in FIG. 10.

The trajectory of the cutting-up operation need not necessarily be in the shape of a circular arc such as the one in the above example. For example, the cutting-up operation can be performed in a straight line so that the tool moves along a trajectory represented by a triangle having two sides for cutting-up and cutting-in operations. In this case, this operation can be defined by arbitrarily setting the cutting-up/cutting-in angles and cutting-up/cutting-in amounts. Alternatively, the cutting-up operation may be defined by an arbitrary curve.

Figure 8:
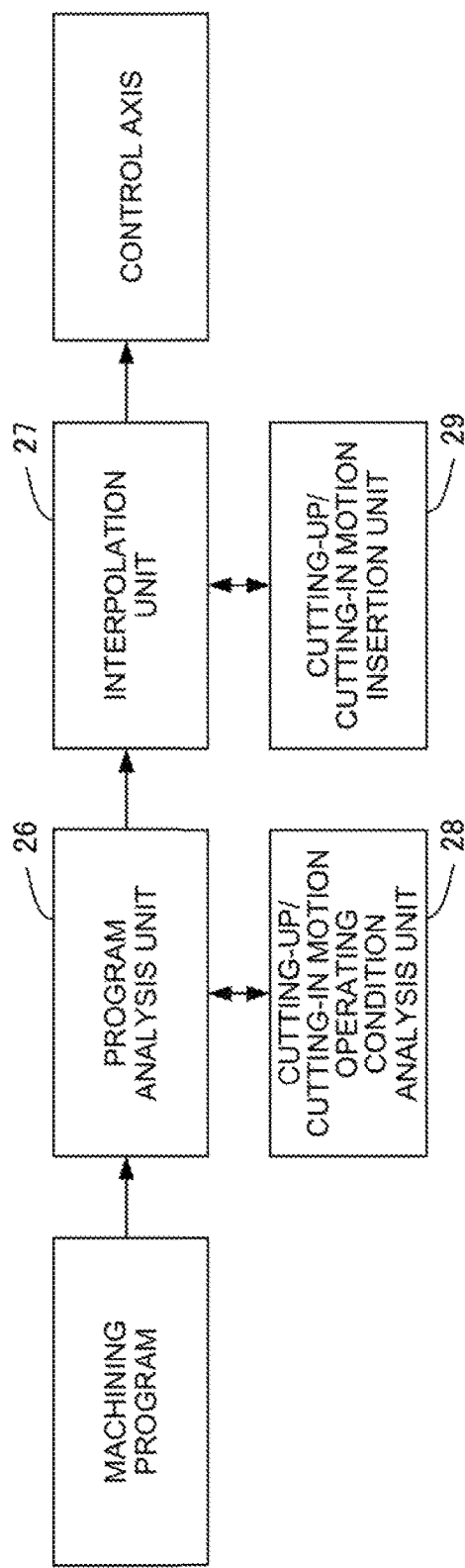
FIG. 8 is a block diagram showing a functional configuration of the controller of FIG. 4.

FIG. 8 is a block diagram showing a functional configuration of the controller 10 of the present embodiment.

The CPU 11 of the controller 10 reads out and executes the system programs stored in the ROM 12, thereby operating as a program analysis unit 26, interpolation unit 27, cutting-up/cutting-in motion operating condition analysis unit 28, and cutting-up/cutting-in motion insertion unit 29. The program analysis unit 26 analyzes the machining program read out from the CMOS memory 14 and outputs analysis data.

When the program analysis unit 26 recognizes a cutting-up/cutting-in motion operating condition command block in the machining program, the cutting-up/cutting-in motion operating condition analysis unit 28 is activated to analyze it and create analysis data on the cutting-up/cutting-in motion, and outputs the data to the program analysis unit 26. Based on the analysis data acquired from the program analysis unit 26, the interpolation unit 27 creates and outputs a lathe-turning movement command to be output to the control axis. Moreover, the cutting-up/cutting-in motion insertion unit 29 is activated at the timing for activating the cutting-up/cutting-in motion. The cutting-up/cutting-in motion insertion unit 29 creates a cutting-up/cutting-in motion command and outputs it to the interpolation unit 27. The insertion of the cutting-up/cutting-in motion is implemented when axis control is performed based on the cutting-up/cutting-in motion command. This cutting-up/cutting-in motion command may be either a circular motion command such as that shown in FIG. 6 or an arbitrary straight or curved motion command.

Figure 9:
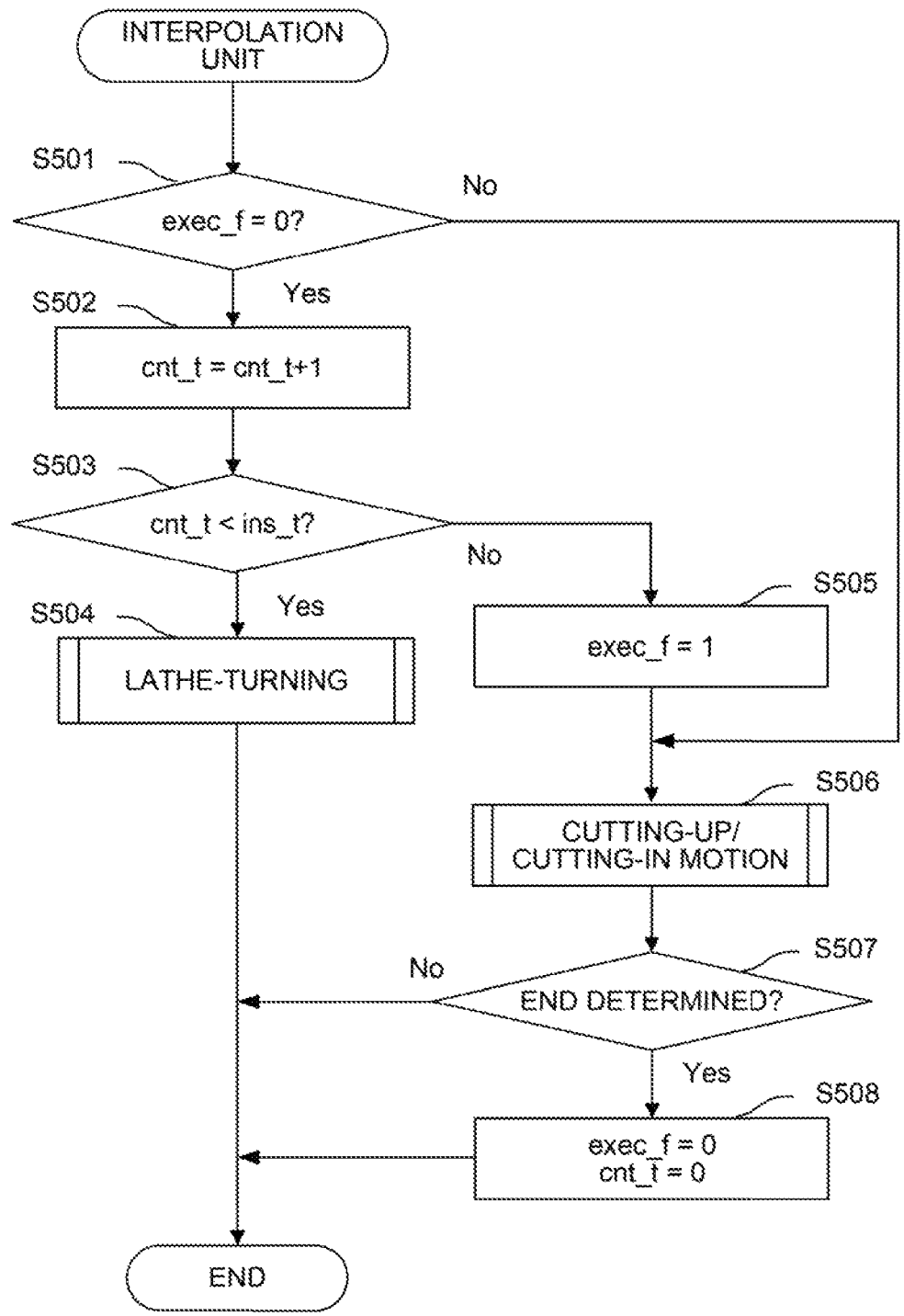
FIG. 9 is a flowchart showing cutting-up/cutting-in insertion processing performed by the controller of FIG. 4.

FIG. 9 is a flowchart illustrating cutting-up/cutting-in insertion processing by the interpolation unit 27.

In the flowchart of FIG. 9, a cutting-up/cutting-in motion execution flag exec_f is a flag that indicates whether or not the cutting-up/cutting-in motion is currently being executed. Moreover, a time counter cnt_t is a counter that indicates the time elapsed from the previous execution of the cutting-up/cutting-in motion, and a cutting-up/cutting-in motion insertion interval ins_t indicates the insertion interval of the cutting-up/cutting-in motion.

The interpolation unit 27 determines whether or not the cutting-up/cutting-in motion is currently being executed with reference to the cutting-up/cutting-in motion execution flag exec_f (Step S501). If it is determined that the cutting-up/cutting-in motion is not currently being executed, the interpolation unit 27 increments the count of the time counter cnt_t (Step S502). Then, the interpolation unit 27 determines whether the value of the time counter cnt_t is smaller than that of the cutting-up/cutting-in motion insertion interval ins_t (Step S503). If it is determined that the value of the time counter cnt_t is smaller, the interpolation unit 27 continues the axis control based on the lathe-turning movement command (Step S504).

If it is determined in Step S503 that the value of the time counter cnt_t is greater than that of the cutting-up/cutting-in motion insertion interval ins_t, the interpolation unit 27 turns on the cutting-up/cutting-in motion execution flag exec_f (Step S505) to perform cutting-up/cutting-in motion insertion processing based on a cutting-up/cutting-in motion insertion command (Step S506). Thereafter, it is determined whether or not cutting-up/cutting-in motion is ended (Step S507). If the cutting-up/cutting-in motion is not yet completed, the processing of the interpolation unit 27 is ended with the cutting-up/cutting-in motion execution flag exec_f maintained. When the cutting-up/cutting-in motion is ended, on the other hand, the values of the cutting-up/cutting-in motion execution flag exec_f and the time counter cnt_t are cleared (Step S508) to end the processing of the interpolation unit 27.

If it is determined in Step S501 that the cutting-up/cutting-in motion is currently being executed, the motion is continued.

As the above processing of the interpolation unit 27 is repeatedly performed on the controller 10, the cutting-up/cutting-in motion insertion processing for a cutting machining operation based on a cutting machining movement command is executed.

[Optimization of Cutting Path]

The following is a description of some measures for optimizing the cutting-up/cutting-in motion in thread cutting in view of load reduction, cycle time reduction, and the like. Any of the following steps of processing can be implemented, according to a path for the cutting-up/cutting-in motion defined in the machining program, as the cutting-up/cutting-in motion operating condition analysis unit 28 analyzes the operating conditions of the cutting-up/cutting-in motion and the cutting-up/cutting-in motion insertion unit 29 inserts the cutting-up/cutting-in motion.

Figure 11:
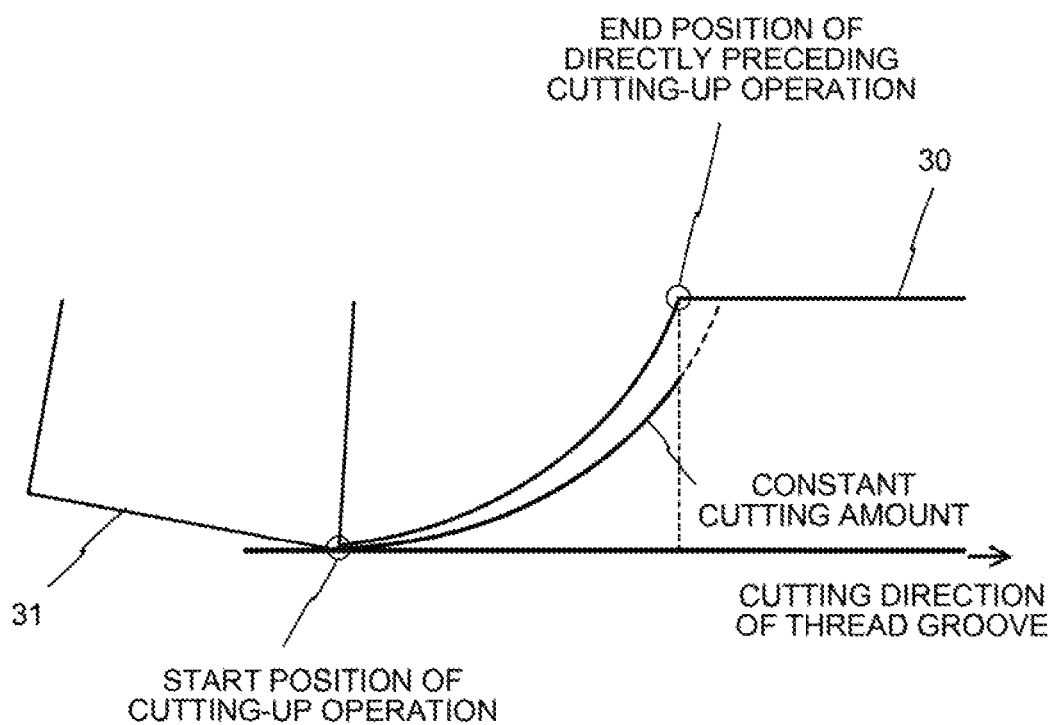
FIG. 11 is a diagram showing an example of the cutting-up/cutting-in motion performed by the controller of FIG. 4.

1. Cutting path which makes a cutting load (cutting amount) during cutting-up operation constant:

The machining time can be reduced by creating such a cutting path that a cutting load (cutting amount) on a tip is constant at its maximum within a tolerance. Specifically, as shown in FIG. 11, a cutting path is generated such that a cutting amount to be obtained starting from the start position of a cutting-up operation until the coordinate value of the end position of the directly preceding cutting-up operation in the length direction of the workpiece 30 is reached becomes constant every time.

Figure 12:
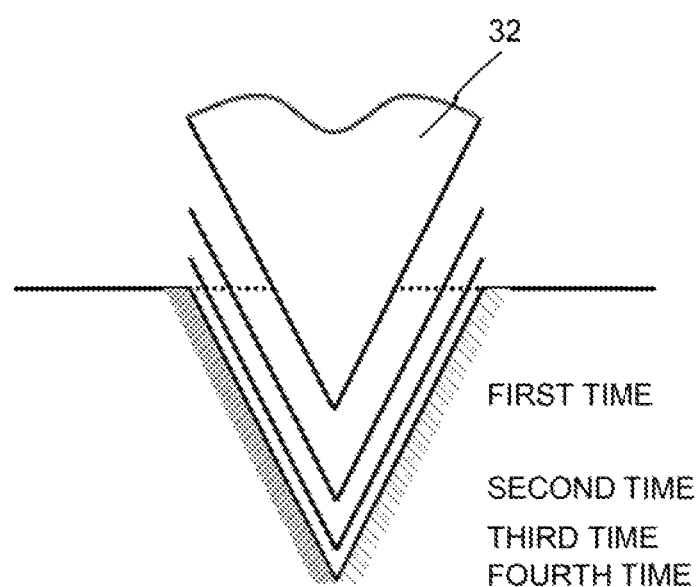
FIG. 12 is a diagram showing an example of the cutting-up/cutting-in motion performed by the controller of FIG. 4.

As shown in FIG. 12, the diameter of a cutting edge 32 of the tool 31 is smaller than that of the base portion, so that both the area of contact between the tool 31 and the workpiece 30 and the cutting load (cutting amount) become larger in a position deeper in the radial direction of the workpiece 30. For cutting-up machining, therefore, the tool path can be generated so that the cutting amount is constant every time by increasing the depth of cut as the tool escapes radially outwardly relative to the workpiece 30.

Figure 13:
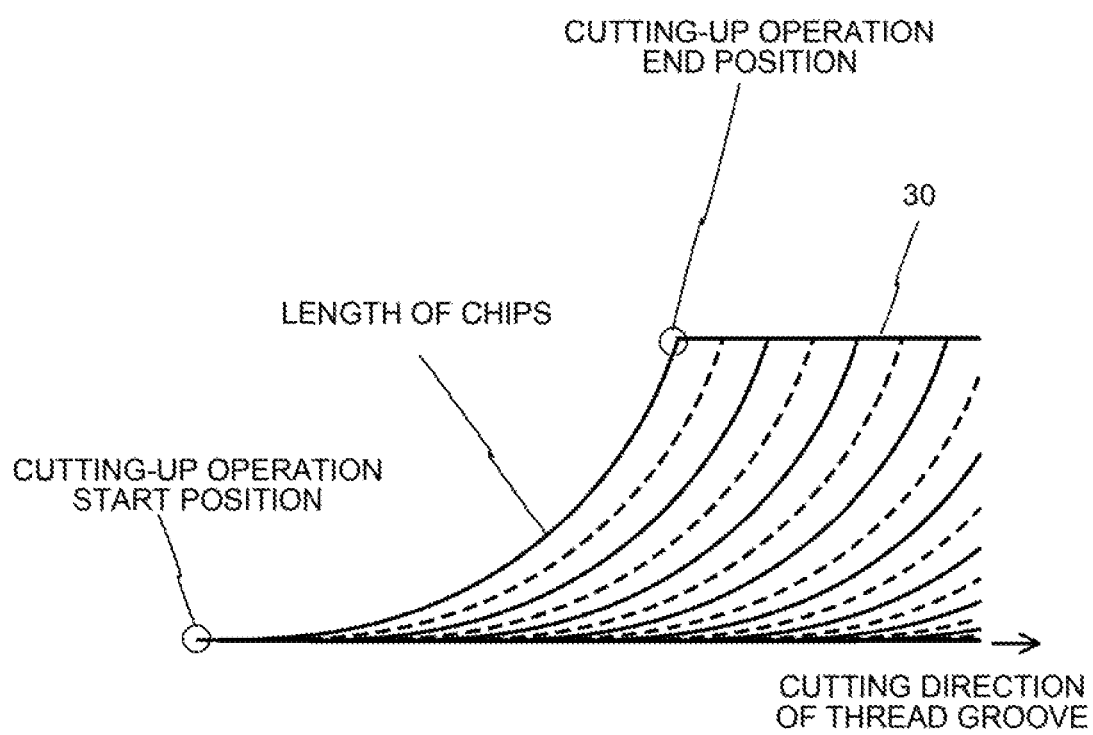
FIG. 13 is a diagram showing an example of the cutting-up/cutting-in motion performed by the controller of FIG. 4.

2. Cutting path which does not allow lengths of chips produced to exceed an allowable length:

The lengths of chips produced according to the present embodiment are supposed to be substantially equal to the distance of the machining path from the start position of a cutting-in operation to the end position of a cutting-up operation, as shown in FIG. 13. An approach operation after the completion of the cutting-up operation moves the axis in the direction opposite to that of the cutting-up operation and then involves slow acceleration and deceleration. Therefore, the higher the cycle frequency of the cutting-up/cutting-in motion in the whole machining, the more the waste of time caused by the acceleration and deceleration will be. In order to reduce the machining time, it is desirable to perform the cutting-up or cutting-in machining for the longest cutting distance within a tolerance, thereby reducing the number of cycles of the cutting-up/cutting-in motion. If the chips are too long, however, they may be caught by the tool or cause damage to the workpiece.

In order to avoid these problems, appropriate measures should be taken to prevent the chip length from exceeding an allowable length. Specifically, the tool path can be generated so that the distance from the start position of a cutting-in operation to the end position of a cutting-up operation should not exceed the allowable length of the chips that is set in advance. It is appropriate to set the allowable length to be, for example, substantially equal to the outer circumferential length of the workpiece or half of it.

3. Thread groove end processing:

Processing for making the thread groove gradually shallower is performed at the terminal end portion of the thread groove. At this terminal end portion, in some cases, an area (hereinafter referred to as the non-interference area) to be originally left without being scraped may sometimes interfere with a cutting-up path of the present embodiment. In this case, it is necessary to change the cutting-up path lest it interfere with the non-interference area. Specifically, if the cutting-up path and the non-interference area interfere with each other, the cutting-up area is changed so as to extend along its border with the non-interference area. Alternatively, the cutting-up operation may be interrupted if the cutting-up area and the non-interference area interfere with each other. Alternatively, moreover, the position of insertion of the cutting-up/cutting-in machining cycle may be changed or the cycle may be interrupted.

Similar problems can be caused in the cutting-in operation and the approach to the cutting-in start position. Also in this case, a cutting-in path and an approach path are controlled so as not to interfere with the non-interference area. Specifically, if the cutting-in path and the non-interference area interfere with each other, the cutting-in operation may be interrupted to perform the cutting-up operation along the border with the non-interference area. Alternatively, the position of insertion of the cutting-up/cutting-in machining cycle may be changed or the cycle may be interrupted.

The present invention is not limited to the above-described embodiment and can be suitably modified and embodied in various forms.

The invention claimed is:

1. A controller configured to control a machine tool which performs thread cutting for a rotating workpiece by moving a cutting tool pressed against the workpiece, according to a machining program, the controller comprising:
    a cutting-up/cutting-in motion operating condition analysis unit configured to analyze operating conditions of a cutting-up/cutting-in motion commanded in the machining program; and
    a cutting-up/cutting-in motion insertion unit configured to insert a cutting-up/cutting-in motion created based on the operating conditions analyzed by the cutting-up/cutting-in motion operating condition analysis unit into the thread cutting,
    wherein the cutting-up/cutting-in motion insertion unit is configured to repeatedly perform, along a thread groove cutting direction, a cycle including performing:
        a cutting-in operation from a start position where the cutting tool cuts into the workpiece to a predetermined depth,
        when the cutting-in operation is complete, a cutting-up operation which cuts chips into pieces by raising the cutting tool for cutting in the radial direction of the workpiece so that the cutting tool escapes to an outside of an outer diameter of the workpiece when the thread is an external thread, or so that the cutting tool escapes to an inside of an inner diameter of the workpiece when the thread is an internal thread, and
        when the cutting-up operation is complete, an operation to cause the cutting tool to approach a subsequent start position for execution of a subsequent cutting-in operation, wherein the approach is a path of the cutting tool that is determined so that the cutting tool does not interfere with the workpiece during the approach to the subsequent start position.

2. The controller according to claim 1, wherein the cutting-up/cutting-in motion insertion unit is configured to perform the cutting-up operation in a path which makes a cutting amount to be obtained starting from the start position of a cutting-up operation until an axial coordinate value of a position in which the cutting tool in the directly preceding cutting-up operation and the workpiece are separated from each other is reached is constant.

3. The controller according to claim 1, wherein the cutting-up/cutting-in motion insertion unit is configured to perform the cutting-in operation and the cutting-up operation in a path in which a path length from a start position of the cutting-in operation to an end position of the cutting-up operation does not exceed a predetermined allowable length.

4. The controller according to claim 1, wherein the cutting-up/cutting-in motion insertion unit is configured to change a path for the cutting-in operation, a path for the cutting-up operation, or a path for the operation for the approach, interrupt the cutting-in operation, the cutting-up operation, or the operation for the approach, or change an insertion position for the cycle if a predetermined non-interference area in the workpiece interferes with the path for the cutting-in operation, the path for the cutting-up operation, or the path for the operation for the approach.

* * * * *